Patented Jan. 6, 1948

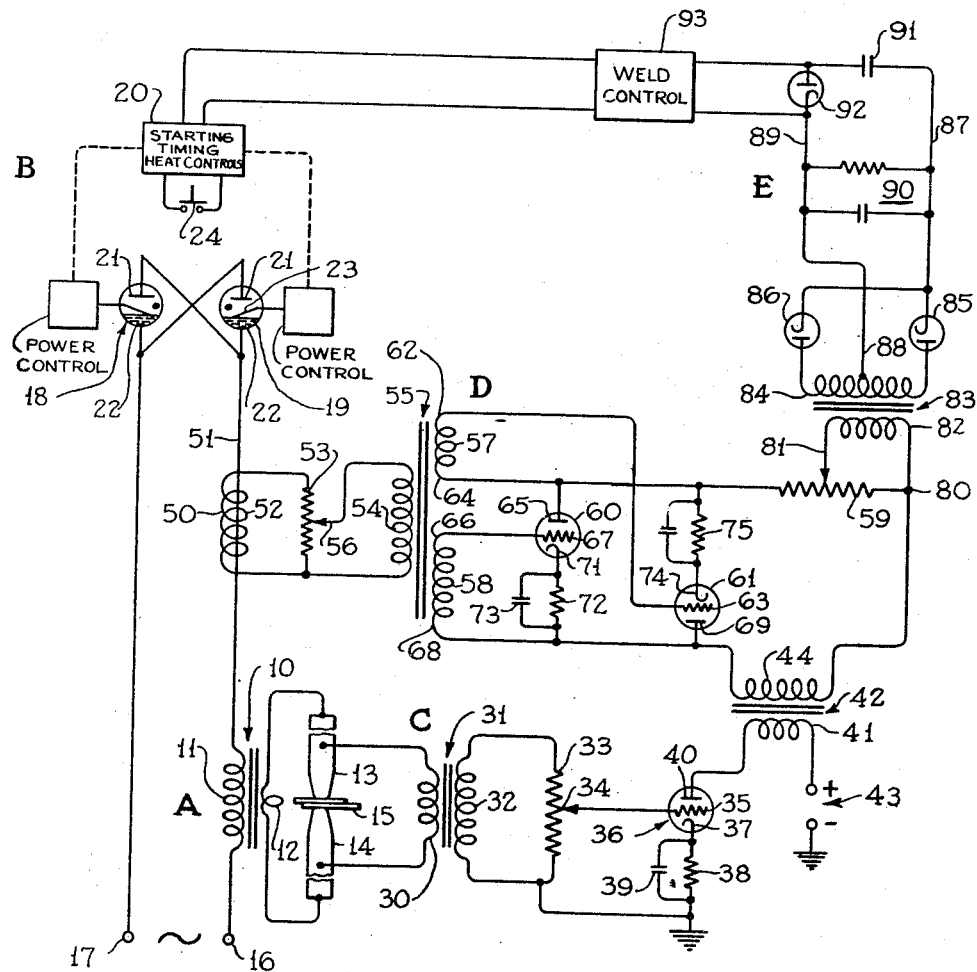

2,434,132

UNITED STATES PATENT OFFICE 2,434,132

WELD CONTROL SYSTEM WITH CURRENT COMPENSATION

Herbert Doane Van Sciver, II, Merion, Pa., assignor to The Budd Company, Philadelphia, Pa., a corporation of Pennsylvania Application May 23, 1944, Serial No. 536,882

6 Claims. (Cl. 323—22)

This invention relates to an electrical system for controlling a weld and for automatically compensating for variations in current supplied to the weld.

In my copending application, Serial No. 524,243, filed February 28, 1944, I have described a weld control system in which utilization is made of the change of voltage occurring during the period of weld at the weld point for establishing a control of the welding circuit as by opening the circuit when the weld is complete. By this system it is possible to supply welding current to the workpiece continuously and without utilization of accessory timing means which will automatically open the circuit as soon as the metal becomes fused at the weld point and the weld is completed. In such control system, however, inaccurate results may arise due to the fact that there may be variation in source line voltage, in load current, in operation of the various electronic or relay devices, or in other circuit apparatus which will tend to cause a momentary but undesirable change in the current flow through the primary of the welding transformer and which will be effective in the weld control circuit and register improperly in the indicating or operating devices of the system.

It is an outstanding object of the present invention to provide, in weld control apparatus, circuit means for compensating for effects of variations in the current flowing in the welding circuit. Other related objects will appear on consideration of the following description of a preferred embodiment of my invention together with the drawing illustrating diagrammatically a wiring diagram of this system.

Referring to the drawing, there is indicated therein a circuit arrangement having component parts indicated by the capital letters A, B, C, D, and E, respectively, and denoting the welding transformer, the welding transformer control unit, the weld voltage amplifying unit, the current compensating unit, and the weld control circuit.

The welding transformer circuit includes the transformer 10 having a primary 11 and secondary 12. The secondary of the transformer is connected to the electrodes 13 and 14 which are adapted to include and compress between them the workpiece 15. The primary 11 of the welding transformer 10 at one end is connected to a power source terminal 16 for alternating current and the other end is connected to the associated power source terminal 17 through inversely connected ignitrons 18 and 19 in the B unit of the system.

The B unit includes the starting, timing and heat control units generally designated by numeral 20, as well as the ignitrons 18 and 19. These ignitrons which are of conventional construction, including an anode 21, cathode 22, and igniter 23, within a gas filled chamber and the anode of each tube is connected to the cathode of the other tube, the cathode of tube 19 having connection to the transformer primary 11 and the cathode of tube 18 having connection to the source terminal 17. The igniters are each connected to power control circuits of conventional arrangement as well as to the control circuits for starting time and heating as utilized in the usual form of synchronous resistance welding. The initiating switch 24 is indicated as associated with the starting time and heat control circuits.

The C, or amplifying unit, is illustrated as having direct connection to the electrodes 13 and 14 of the welding equipment. As shown, the primary 30 of an impedance matching transformer 31 is connected at either end to one of the electrodes, the point of attachment being such as to obtain in effect the voltage drop across the workpiece at the weld point. The secondary 32 of the transformer 31 is connected in series with a resistor 33 which serves as a potentiometer for a sliding contact 34 having connection to the grid 35 of an amplifying vacuum tube 36 so that variation of grid potential of the tube may be readily effected by shifting the slider 34 along the resistor 33. Tube 36 includes also the cathode 37 connected to ground through a biasing resistor and capacitor 38 and 39, and an anode 40 connected directly to the primary 41 of a coupling transformer 42. The primary 41 also has connection through a source of positive potential 43 to ground.

The secondary 44 of the coupling transformer 42 may be directly connected to the weld control circuit E but if so connected without any intervening control apparatus it would fail to make correction or compensation for current variation in the primary of the welding transformer circuit. Accordingly, I have found it important to utilize the D circuit in association with the amplifying circuit C so that the two circuits in combination deliver to the weld control circuit a signal developed at the weld point on completion of weld which is correct as regards its relation with a voltage drop at the weld point. This current compensating circuit D comprises a current transformer 50 in electrical association with the primary circuit 51 intermediate the welding transformer 11 and the control unit B, the secondary 52 thereof being in series with a resistor 53. One end of the resistor has connection through the primary 54 of a phase inverting transformer 55 to a contact slide 56 engaging the resistor 53.

The secondary of the phase inverting transformer 55 includes two coils 57 and 58 which may be connected to the circuit including the secondary 44 of the coupling transformer 42 and also a resistor functioning as a potentiometer or voltage divider 59 and thermionic vacuum tubes 60 and 61 connected so as to pass current through the voltage divider on successive alternate half-cycles of the current transmitted from the current transformer 50. The coils 57 and 58 are wound in opposite sense so as to produce a phase change of 180° in transmitted impulse. In the specific adaptation shown, the ends 62 of secondary 57 is connected to the grid 63 of tube 61 and the end 64 of the secondary 57 is connected to the anode 65 of tube 60 and to the voltage divider 59. Similarly, the end 66 of secondary 58 is connected to the grid 67 of tube 60 while the end 68 of this coil is connected to the anode 69 of tube 61 and to the other end of the voltage divider 59 through secondary 44 of transformer 42. Also, cathode 71 of tube 60 has connection to the point 68 of secondary 58 through the biasing resistor 72 and capacitor 73 and the cathode 74 of tube 61 has connection to the point 64 of secondary coil 57 through biasing resistor 75 and capacitor 76.

The E unit of the system is adapted to receive current from the voltage divider 59 between points 80 at one end of the divider and slidable contact 81, this voltage being impressed across the primary 82 of amplifying transformer 83, the secondary 84 of which has connection through rectifying tubes 85 and 86 to the positive side of a conductor 87 in the E circuit. The negative side leads from the mid-point 88 of the transformer secondary 84 to the negative conductor 89 of the E circuit. Suitable filtering means 90 are utilized to smooth out the rectified current. From the rectifying apparatus the circuit is led through the capacitor 91 and rectifying tube 92 and the voltage drop across the tube 92 is passed through a suitable translating circuit, indicated as the weld control 93, to the starting, timing and heat control circuits 20 where the appropriate relay or other apparatus is energized to open the welding circuit.

The operation of the circuit to accomplish the objects of the invention may now be detailed. The workpiece 15 having been positioned between the electrodes 13 and 14 and compressed thereby through the usual mechanism available in resistance welding apparatus, source current is made effective at the terminals 16 and 17 to place the power controls in condition for operation. The initiating switch is then closed, thus activating the starting, timing and heat control and power control sections of the circuit to bring about a flow of welding current through the primary and secondary of the transformer 10 and thus through the welding electrodes 13 and 14. The welding current in passing through the workpiece heats the same, particularly at the interface of the plates, as shown, to produce a nugget of molten metal.

Prior to the development of the fused area, a definite potential drop occurs across the workpiece which is transferred through the C amplifying unit to voltage divider 59 in the D and E circuits. There is thus impressed across the voltage divider, between the point 80 and slide 81, a voltage drop which is related directly to the voltage drop between the electrodes. Should the weld now be completed, the resistance at the interface of the workpiece drops and a new value of potential develops across the eelctrodes which is made effective between points 80 and 81 of the voltage divider 59. This change of potential is made effective on the comparator unit E which functions to energize an indicator or to open the welding circuit; but simultaneously with the development of the signal there may occur a current variation in the primary of the welding circuit which will upset the accuracy of the indication or prevent the proper operation of the control mechanism. Should this fortuitous current change occur in the welding primary circuit, it is at once made apparent in the current transformer 50 of the D circuit and, depending on whether or not the half-cycle is positive or negative, will be translated to the grid of either tube 60 or 61 of this circuit. Assuming the tube 60 as active in passing a positive half-cycle of current and assuming that a voltage drop occurs in the primary welding circuit resulting in a diminution of current flow, the construction and connections of the secondary 58 of the transformer 55 is such as to produce an increment of positive potential on the grid 67 whereby current through the tube 60 is increased. This causes an increase of current flow in the voltage divider 59 from points 80 to 81 thus increasing the voltage drop and automatically compensating for the voltage drop occurring between the electrodes in the workpiece and made effective at the voltage divider 59 through the transformer 42. It is thus apparent that irrespective of chance variations in the current in the primary welding circuit, the potential drop made effective in the voltage divider 59 relates only to that occurring between the electrodes and hence a correct and uniform signal is transmitted to the comparator circuit E.

As previously mentioned, circuit E is effective to develop the initial voltage across the electrodes prior to the breakdown of the metal at the interface of the workpiece and this is accomplished through the capacitor 91 which assumes the maximum initial voltage and which, after the voltage drop at the weld point due to completion of the weld, discharges through the weld control 93 to set in motion the apparatus in the starting controls 20 to bring about an opening of the welding circuit or to afford an indication of the completion of a successful weld.

It is apparent that the circuit, as disclosed, includes only the essential branch circuits and apparatus necessary for accomplishing the objects of the invention. Refinements may be made such, for example, as inclusion of additional apparatus for removing ripples from the circuit rectified through transformer 83 in the E circuit. Various other modifications may be made in accomplishing the main result of the invention, namely, to compensate for chance variations in the weld current during the time a weld is taking place.

What is claimed is:

1. In combination a power source, a load circuit connected to said power source, a resistor, translating means between said load circuit and said resistor, and compensating means connected between said power source and resistor effective to compensate in said resistor for chance variations in current in said load circuit, said compensating means comprising a current transformer connected to said power circuit, a phase inverting transformer connected to said current transformer having a dual coil secondary, two electronic tubes having anode, grid and cathode elements and each connected in reverse parallel across said resistor and conductors connecting the anode and grid of each tube to separate dual coil secondaries whereby changes of current flow in said resistor due to current changes external to said load are compensated.

2. A current compensating system comprising a power source, a load circuit connected to said power source, a resistor, translating means between said load circuit and resistor, and current compensating means between said load circuit and said resistor effective to compensate in said resistor for current variations in said load circuit, and control means connected to said resistor, said current compensating means comprising a current transformer electrically related to the power source, a transformer connected to said current transformer having dual secondary coils, two vacuum tubes connected in reverse parallel with reference to the resistor, each tube having a grid connected to one of said coils and an anode connected to the other of said coils, the grids being connected to separate coils and the cathode of each tube having attachment to the anode of the other tube whereby said tubes alternately pass current in successive half-cycles of alternating current flow, the phase relationship of the grids of said tubes being such as to increase the current flow through the resistor on decrease of power circuit current and to decrease the resistor current on increase of power circuit current.

3. In combination, an electric power source, a load circuit connected to said power source, means for applying power impulses to said load circuit, voltage responsive means connected to said load circuit dependent on load voltage change for terminating said power impulses, and means for additionally controlling said voltage responsive means in response to current variation in said load circuit during the time of transmission of said power impulses.

4. In combination, a power source, a load circuit including a load connected to said power source, means for applying power to said load circuit and load, control means for power mechanism connected to said load circuit at said load adapted for actuation only by load current and voltage changes, and means connected to both load circuit and control means for compensating in said control means for current changes in said load circuit, whereby said control means functions only on voltage changes in said load.

5. In combination, an electric power source, a load circuit adapted to include a load connected to said source, a voltage actuated unit, connections from said load circuit at said load to said unit for transmitting load voltage change to said unit, and means for compensating in said unit for voltage change due to current change in said load circuit, said means including a current transformer connected to the load circuit, rectifying means for said transformed current, and means for adjusting the magnitude of compensation of said compensation means.

6. In combination, an electric power source, a load circuit connected to said power source and subject to voltage and current change while supply of power is being delivered thereto from said source, a control element connected to said load circuit and actuated by load voltage change, current change cutout means connected to said control element and to the load circuit for disconnecting said load and source on occurrence of load voltage change, and compensating means connected between said load circuit and control element effective to compensate in said control element only for current variations in said load circuit, said compensating means comprising a current transformer connected to the load circuit and control element, and voltage change means connected to the transformer and control element for translating current change in said transformer to voltage change in said control element.

HERBERT DOANE VAN SCIVER, II.

REFERENCES CITED

The following references are of record in the file of this patent:

UNITED STATES PATENTS

| Number | Name | Date |
|---|---|---|
| 1,533,680 | Widerhold | Apr. 14, 1925 |
| 1,810,739 | Vedder | June 16, 1931 |
| 1,858,271 | Harness | May 17, 1932 |
| 1,959,690 | Roth | May 22, 1934 |
| 1,991,414 | Rees | Feb. 19, 1935 |
| 2,001,037 | Rea | May 14, 1935 |
| 2,057,490 | Jenks | Oct. 13, 1936 |
| 2,118,644 | Garman | May 24, 1938 |
| 2,195,119 | Moyer | Mar. 26, 1940 |
| 2,217,476 | Gulliksen | Oct. 8, 1940 |
| 2,306,593 | Collom | Dec. 29, 1942 |
| 2,355,453 | Livingston | Aug. 8, 1944 |